United States Patent Office

2,965,544
Patented Dec. 20, 1960

---

2,965,544

TISSUE CULTURE PROPAGATED CANINE DISTEMPER VIRUS AND VACCINE THEREOF

Victor Jack Cabasso, Pearl River, N.Y., assignor to American Cyanamid Company, New York, N.Y., a corporation of Maine No Drawing. Filed Feb. 24, 1959, Ser. No. 794,806

3 Claims. (Cl. 167—78)

This invention relates to an improved virus vaccine for canine distemper (hereafter abbreviated C.D.) and to a process of preparing the vaccine.

C.D. virus vaccine is usually prepared by developing an avirulent strain adapted to propagate in chick embryos and then inoculating live chick embryos therewith, incubating for a number of days and harvesting the infected tissue. The standard C.D. vaccine is effective immunologically but still has the disadvantage of being contaminated with the tissue of the embryos which sometimes may result in undesirable side reactions in the host. In the past, these side reactions have perforce been tolerated in order to obtain the desired immunity.

According to the present invention, the chick embryo adapted C.D. virus is propagated in tissue cultures which contain only a minimum of chick embryo tissues. The solution, however, is not a simple one. Attempts to propagate a modified C.D. virus in tissues of dogs and ferrets failed and up to the time of the present invention, no tissue propagated C.D. virus vaccine has been prepared.

According to the present invention, it is found that if the C.D. virus, modified to avirulence, is propagated in chick embryo tissue cultures, not in live embryos, it will grow and vaccines harvested from C.D. virus thus grown are substantially free from the disadvantages of the standard C.D. virus vaccine which is grown in live embryos. Apparently the culture of chick embryo tissue does not produce undesirable side reactions in the host when these vaccines are used for the immunization of dogs. It is not known which of the constituents present in the embryonated egg are primarily responsible for the undesired side reactions, and which are not present in the tissue culture vaccine of the present invention. Therefore the present invention is not intended to be limited to any theory of why the improved results are obtained.

Frequently, a vaccine, or rather the virus content thereof, loses its antigenicity when serially cultured in heterologous tissues. It is an important advantage of the present invention that it does not occur, even after forty-two passages through chick embryo tissue culture. The resulting vaccine is antigenic at a remarkably low virus $CED_{50}$ of 0.15 per 0.2 ml. (the $CED_{50}$ is expressed logarithmically). The virus may be harvested in the form of a vaccine after the first tissue culture passage but normally is only harvested after a number of passages as there is some increase in titer with serial passages.

Not only does the virus remain substantially unchanged in its antigenicity with successive passages through chick embryo tissue culture but its virulence for live chick embryos is also retained and it shows a titer of from $10^{3.0}$ to $10^{4.5}$ per milliliter of infected culture suspension. These titers are of the same order as those obtained from live chick embryo grown virus.

The effectiveness of the vaccines obtained by tissue culture passage has been established by virus neutralization methods using original C.D. virus and by the standard ferret immunization. The results of these tests will be set out in greater detail at a later point in the specification.

It is an advantage of the present invention that the harvested vaccine is not particularly labile and may be freeze dried for storage without significant loss in effectiveness. Loss of $CED_{50}$/milliliter amounts to no more than 1.0 to 1.5 and there is no loss in immunilogical activity as the $CED_{50}$ remains well above the minimum for useful immunization. In other words, the improved characteristic of the vaccine, lack of serious side reactions, is achieved without any off-setting disadvantages.

The tissue culture used in the present invention can be obtained from chick embryos of various ages. It constitutes, therefore, no particular problem requiring special control. Excellent results are obtained by using tissues from nine day old embryos and these tissues, which are simply illustrative of the embryo tissue usable in the present invention, were used in the following specific illustrative examples.

EXAMPLE 1

Trypsinized total chick embryo tissues from nine day old embryos were prepared by the standard method of Dulbecco and Vogt, J. Exp. Med., volume 99, page 167. The cultures were used in standard Povitsky bottles, growth medium fluid consisting of Earle's basal medium containing lactalbumin hydrolysate and from 15% to 20% normal calf serum. Just before inoculation in each passage, the culture bottles were renewed with 100 milliliters of the so-called synthetic mixture No. 199 described in Proc. Soc. Exp. Biol. and Med., volume 73, page 1. Inoculation was made with the 48th passage of modified C.D. virus through live chick embryos, inoculum being 5.0 ml. of a 40% infected chorioallantoic membrane. The bottles were incubated at 37° C. and examined microscopically for 7 days. There was no gross cytopathogenic effect observed and each passage was effected by detaching monolayers into the fluid, cooling the fluid grinding and inoculating with 5.0 ml. suspension per bottle of tissue culture. Serial transfers were continued and, after the 15th passage and through a total of 64 passages, the harvests were not only inoculated as undiluted suspension but were also titrated in chick embryos, giving titers ranging from $10^{2.1}$ to $10^{5.2}$ with the majority being between $10^{3.0}$ and $10^{4.5}$. These titers are of the same order of those with virus obtained by passing through live chick embryos.

Virus yields from the 19th and 20th serial passages were determined at different days of incubation and showed that a maximum was reached on the fourth day. After harvesting on the fourth day, grinding in a Waring blender, the suspensions were freeze dried for storage.

EXAMPLE 2

The identity of the virus in the vaccines produced were diluted ten fold and was confirmed by the neutralization test using a 1:8 dilution of C.D. immune dog serum and normal dog serum and the $CED_{50}$ calculated by inoculating with 0.2 ml. doses of each serial ten fold dilution into the chorioallantoic membrane of chick embryos, followed by 7 days incubation at 35–36° C. Infected membranes were then observed for typical thickening and opaque foci and the $CED_{50}$ calculated by the Reed and Muench formula described in Am. J. Hyg., volume 27, page 493. The $CED_{50}$ obtained are those described in the general portion of this specification.

EXAMPLE 3

The effectiveness of the vaccines produced by Example 1 were tested by inoculation intraperitioneally of normal ferrets with 1.0 ml. of fresh undiluted suspension and also 1 ml. doses of vaccine obtained by reconstitution to standard volume with sterile distilled water of the freeze dried vaccines. Dilutions were also carried out ten fold, a hundred fold and a thousand fold.

The ferrets, together with normal control ferrets who had received no vaccine, were then challenged with a standard strain of virulent C.D. virus. The results appear in the following table, the vaccines being taken from various passage levels as indicated in the table:

*Table*

IMMUNIZATION OF FERRETS WITH TISSUE CULTURE C.D. VIRUS

| Passage Level | Inoculum Dilution (1 ml.) | $CED_{50}$ Injected | Challenge Results: No. Dead from challenge/total number challenged | |
|---|---|---|---|---|
| | | | Immunized Ferrets | Control Ferrets |
| 22 | Undiluted | 2.9 | 0/2 | 2/2 |
| 34 | do | 3.4 | 0/2 | |
| 42 | do | 5.2 | 1,2 1/2 | |
| | $10^{-1}$ | 4.2 | 0/3 | |
| | $10^{-2}$ | 3.2 | 2 0/2 | 2/2 |
| | $10^{-3}$ | 2.2 | 0/3 | |
| | $10^{-4}$ | 1.2 | 2 0/2 | |
| | $10^{-5}$ | 0.2 | 0/3 | |

1 One ferret died of pneumonia 10 days after challenge without distemper symptoms.
2 Immunized ferrets which died of intercurrent injection before challenge and showed no distemper symptoms were omitted from the table.

It will be noted that in every case, even with dilutions as high as a hundred thousand with $CED_{50}$ as low as 0.2, complete immunity resulted. The reconstituted frozen vaccines were used in the same manner as described above, the frozen vaccines taken from three different passage levels and one of them being used undiluted as well as with three dilutions. The results appear in the following table:

*Table*

IMMUNIZATION OF FERRETS WITH EXPERIMENTAL TISSUE CULTURE C.D. VACCINES

| Passage Level | Inoculum Dilution (1 ml.) | $CED_{50}$ Injected | Challenge Results: No. Dead from challenge/total number challenged | |
|---|---|---|---|---|
| | | | Immunized Ferrets | Control Ferrets |
| 33 | Undiluted | 2.7 | 0/3 | 2/2 |
| 33 | do | 2.2 | 0/3 | 2/2 |
| 34 | do | 3.2 | 1 1/6 | 4/4 |
| | $10^{-1}$ | 2.2 | 0/3 | |
| | $10^{-2}$ | 1.2 | 0/3 | |
| | $10^{-3}$ | 0.2 | 0/3 | |

1 One ferret died of intercurrent injection without distemper symptoms.

It will be noted that as in the case of the fresh vaccine, uniformly effective immunization resulted. In no case were any side reactions observed as is sometimes the case with C.D. vaccines obtained by serial passages through live chick embryos.

I claim:

1. A process of propagating canine distemper virus modified by passage through live chick embryos for a sufficient number of passages until on injection into susceptible ferrets and dogs the animals did not show distemper symptoms, which comprises inoculating the so-modified virus into a culture of trypsinized chick embryo tissue in vitro, incubating and harvesting the resulting vaccines for a number of serial passages through such trypsinized tissue to obtain a canine distemper vaccine of immunological titer and antigenicity undiminished with respect to that of the live chick embryo-modified virus but of diminished embryonic tissue contamination.

2. A process according to claim 1 in which the vaccine is freeze-dried.

3. A canine distemper vaccine prepared according to claim 1.

References Cited in the file of this patent

Ross et al.: "Use of Tissue Cultures in Virus Research," December 1956, in Annual Rev. of Microbiology, vol. 11, 1957, pp. 459–508.

Cox: "Growth of Viruses in Rickettsiae in the Developing Chick Embryo," Ann. of the N.Y. Academy of Sci., vol. 55, Art. 2, 1952, pp. 236–247.

Celiker et al.: "Effect of Temperature, pH and Certain Chem. on Egg-Cultivated Distemper Virus," Cornell Vet., 44(2); 276–280, 1954, in Biol. Abst., 29:4, p. 894. April 1955.

Cabasso et al.: "Propagation of Canine Distemper Virus on the Chorio-Allantoic Membrane of Embryonated Hen Eggs," in Proc. Soc. Exptl. Biol. and Med., vol. 71, pp. 246–7, June 1949.

Cabasso et al.: "Propagation of Canine Distemper Virus in Tissue Culture," in Proc. Soc. Exptl. Biol. and Med., vol. 100, No. 3, pp. 551–554, March 1959.

Cabasso et al.: "Propagation of Infectious Canine Hepatitis in Tissue Culture," in Proc. Soc. Exptl. Biol. and Med., vol. 85, No. 1, pp. 239–245, February 1954.

Rockborn: "Canine Distemper Virus in Tissue Culture," in Archiv. Virus for Sch., 1958, vol. 8, p. 485.

Hanks: "An Introduction to Cell and Tissue Culture," page 22 (1955).

Lasfargues: Anatomical Record, 117, 127 (1957).

Hinz et al.: Bacteriological Proceedings, 64 (1959).